3,849,349
POLYISOCYANURATE FOAM AND PROCESS FOR PRODUCING THE SAME
Kurt C. Frisch, 17986 Parke Lane, Grosse Ile, Mich. 48138, and Kaneyoshi Ashida, 1-3-20 Nichihara-cho, Shibuya-ku, Tokyo, Japan
Filed May 12, 1971, Ser. No. 142,589
The term of this patent subsequent to Feb. 19, 1991, has been disclaimed
Int. Cl. C08g 22/18, 22/46
U.S. Cl. 260—2.5 AW                    23 Claims

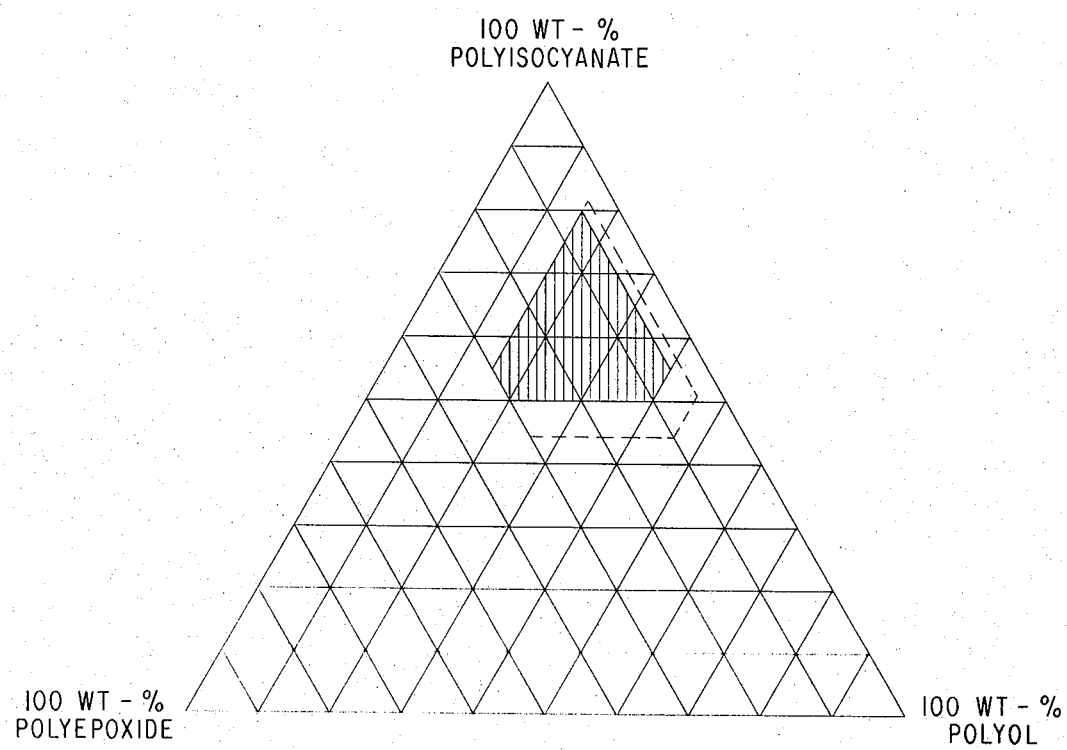

ABSTRACT OF THE DISCLOSURE

Resins having a polyisocyanurate structure are produced by one shot process by reacting a polynuclear polyisocyanate, a polyepoxide and a polyol in the specific proportions and in the presence of a trimerization catalyst. Foamed resins of the foregoing type exhibit unexpectedly low friability, low smoke evolution, and high flame resistivity, and thus are useful as building materials and for other applications requiring a combination of high heat and flame resistance. These resins are also useful as coatings, adhesives, elastomers, and the like.

BACKGROUND OF THE INVENTION

The trimerization reaction of isocyanates to yield isocyanurate rings, has been known for over a hundred years. The isocyanurate rings is characterized by high thermal and hydrolytic stability. In recent years, the preparation of rigid foams containing isocyanurate rings has been described by a number of investigators. Because of the high crosslink density of isocyanurate foams, efforts have been made to reduce the inherent friability of these foams by modification with other groups. Burkus in U.S. Pats. 2,979,485 and 2,993,870 and Nicholas and Gmitter, J. Cellular Plastics, 1, 85 (1965) reported the preparation of isocyanurate-containing urethane foams by trimerization of isocyanate-terminated prepolymers.

Urethane-modified isocyanurate foams, prepared by the one-shot method have been described by Bernard et al. in Belgian Pat. 712,731 and Ball et al. in J. Cellular Plastics, 4, 248 (1968). Urethane and polyamide modified isocyanurate foams, prepared by the one-shot method have been reported by Ashida et al. in British Pat. 1,155,768. The latter described the preparation of these foams employing polymeric isocyanate, polyester or polyether polyols, carboxyl-terminated polyesters or polymerized fatty acids, using different trimerization catalysts including tertiary amines and alkali metal carboxylates.

Carbodiimide-containing isocyanurate foams have been disclosed in Belgian Pat. 723,151.

Very recently, the preparation of one-shot, high temperature resistant, rigid foams, having low flame spread ratings, was described by Hayash et al. in Canadian Pat. 833,619. These foams containing oxazolidone linkages were prepared by reaction of polymeric isocyanates with monomeric polyepoxides using triethylene-diamine as a catalyst. While such epoxy-modified isocyanurate foams do have enhanced flame resistivity, no remarkable improvement in friability can be obtained.

The preparation of polyoxazolidones by the reaction of isocyanates with polyepoxides is broadly disclosed in U.S. Pat. 3,313,747 to Schramm; however, such compounds have not been heretofore polymerized to a polyisocyanurate structure. On the other hand, when such polymerization was carried out in accordance with the present invention, the polyisocyanate foams obtained exhibited unexpectedly low friability as well as high flame resistivity.

It is an object of this invention to provide a polyisocyanurate resin having improved physical properties.

It is a further object of this invention to provide polyisocyanurate foams having low friability, low smoke evolution, and high flame resistivity.

Another object is to provide highly temperature-resistant and highly flame-resistant materials.

Another object is to provide a method for producing a polymer material having improved physical properties.

Still other objects will readily present themselves to one skilled in the art upon reference to the ensuing specification and claims.

SUMMARY OF THE INVENTION

The present invention contemplates an improved polyisocyanurate resin and a method for producing the same. The polymer of the present invention is obtained by one-stage reaction of a polynuclear polyisocyanate, a polyepoxide, a polyol, and an effective amount of an isocyanate trimerization catalyst such as a tertiary amine having no active hydrogen atoms or the like. Blowing agents and surfactants can be incorporated into the formulations if it is desired to produce a polyisocyanurate foam.

In the reacting components of this invention the relative amounts of the polynuclear polyisocyanate, the polyepoxide, and the polyol that are present are such that the epoxy/NCO equivalent ratio is in the range of about 0.1 to about 0.6 and the OH/NCO ratio is in the range of about 0.15 to about 0.40. In terms of weight percent of the reacting components the polynuclear polyisocyanate is present in an amount of about 45 to about 82 weight percent, the polyol is present in an amount of about 15 to about 45 weight percent, and the polyepoxide is present in an amount of about 3 to about 30 weight percent. The preferred ranges of the foregoing ingredients are about 50 to about 80 weight percent of polynuclear polyisocyanate, about 15 to about 40 weight percent of polyol, and about 5 to about 30 weight percent of polyepoxide.

The polyisocyanurate resins of this invention are useful as building or structural materials in applications which can range from foams to cast products, including adhesives, coatings, elastomers, etc.

DESCRIPTION OF THE PREFERRED EMBODIMENTS

The modified isocyanurate resins of this invention are prepared by making said three components react at the same time. In polymerization of the present invention, said three reacting components, the trimerization catalyst and any optional additives are normally mixed with each other in one time. However, any mixing order may be applied so far as the reaction of the components occurs in one time. For example, the polyepoxide is first blended with the polyol and the trimerization catalyst, and any optional additives such as a surfactant or a blowing agent in the case of foams. The resulting premix is then admixed with the organic polyisocyanate and the mixture cured. Alternatively, the blowing agent can be blended with the isocyanate, and the obtained blend admixed with the polyol and the polyepoxide. The initial curing can take place at an elevated temperature of about 60° C. to 90° C. for about 1 to 3 hours, followed by curing at about room temperature for about 2 to 10 days. The curing conditions are not critical, and curing only at about room temperature is also satisfactory.

Though a chemical structure of the polymer of the present invention is not completely clear to our inventors, we have found out that the catalyst such as a tertiary amine for trimerizing isocyanate into isocyanurate has also a function of making polyisocyanate react with an polyepoxide or a polyol into a polyoxazolidone or polyurethane respectively. Therefore it may be believed that the polymer of the present invention has oxazolidone rings and urethane bonds other than isocyanurate rings as a part of the chemical structure thereof. One of the advantages of the present invention is that it is possible to obtain polymers having good physical properties through a very simple process or machine, because it is unnecessary to handle any prepolymer usually of high viscosity and all reactants to the polymer react in one time.

The term "organic polynuclear polyisocyanate" as used herein and in the appended claims is taken to mean an organic compound containing two or more isocyanato (—NCO) groups and containing at least two benzene rings or at least one condensed polynuclear structure.

An isocyanate equivalent weight of the polynuclear polyisocyanate shall be in a range of 100–200, preferably 120–160. This condition is necessary in order to obtain the polymer having high temperature resistivity and flame resistivity and low smoke evolution.

Suitable organic polynuclear polyisocyanates for the purposes of the present invention are those which are commonly used in the preparation of polyurethanes. Illustrative of such polyisocyanates are (methylene bridged polyaryl polyisocyanate), such as methylene bis(phenyl isocyanate) (MDI), 4,4'-methylene bis(phenyl isocyanate), 1,5-naphthalene diisocyanate, 4,4'-biphenyl diisocyanate and other di- and higher polyisocyanates. Mixtures of two or more of the above isocyanates can also be used, such as mixtures of 2,4'- and 4,4'-isomer of methylene bis (phenyl isocyanate) and the like. In addition to the 4,4'-methylene bis(phenyl isocyanate) or mixtures of the 2,4'-isomer and the 4,4'-isomer thereof which are employed as the isocyanate component, there can also be used modified forms of these isocyanates. For example, there can be used 4,4'-methylene bis(phenyl isocyanate), or an admixture thereof with a minor amount of the 2,4'-isomer, which has been treated to convert a minor proportion, generally less than 15% by weight of the starting material, to an artifact of the said starting material. For example, the polyisocyanate component can be methylene bis(phenyl isocyanate) which has been converted to a stable liquid at temperatures of about 10° C. and higher.

Illustrative of another modified form of 4,4'-methylene bis(phenyl isocyanate) which can form the polynuclear polyisocyanate component is the product obtained by treating the former compound, or mixtures thereof with small portions of 2,4'-isomer, with a minor portion of a carbodiimide such as diphenylcarbodiimide.

In addition to the various modified forms of methylene bis(phenyl isocyanate) exemplified above there can also be employed as the polynuclear polyisocyanate component polymethylene polyphenyl isocyanates as well as a mixture of methylene bis(phenyl isocyanate) with polymethylene polyphenyl isocyanates of higher functionality. Such mixtures are generally those obtained by phosgenation of corresponding mixtures of methylene bridged polyphenyl polyamines. The latter, in turn are obtained by interaction of formaldehyde, hydrochloric acid and primary aromatic amines, for example, aniline, o-chloroaniline, o-toluidine and the like.

Particularly suitable and thus preferred are organic polynuclear polyisocyanates obtained by the phosgenation of the reaction products of aniline and formaldehyde, represented by the formula

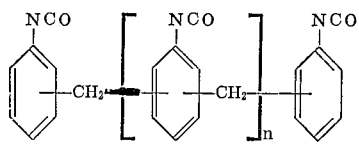

wherein $n$ is an integer having a value in the range from zero to about 10, inclusive.

The term "polyol" as used herein and in the appended claims is taken to mean a polyhydroxy organic compound having alcoholic and/or phenolic hydroxy groups and includes also polyether polyols and polyester polyols.

An adequate polyol has a hydroxy equivalent weight of 30 to 2,000, preferably 100 to 300.

Typical aliphatic or cycloaliphatic polyhydroxy alcohols or polyhydric phenols which can be employed in the present formulations are ethylene glycol, diethylene glycol, glycerol, hexylene glycol, trimethylol propane, pentaerythritol, sorbitol, triethanolamine, inositol, resorcinol, pyrogallol, hydroquinone, cyclohexanediol, 1,5-naphthalene diol, trimethylol ethane, and the like.

The polyether polyols that are suitable include diol-, triol-, tetrol-, pentol-, hexol-, and octol-types as well as phosphorus-containing polyether polyols and phosphorus- and halogen-containing polyether polyols and amine based polyether polyol.

The polyester polyols that are suitable include the neutral polyester type, phosphorus-containing polyester polyols, halogen-containing polyester polyols, and phosphorus- and halogen-containing polyester polyols.

Aromatic based neutral polyols and aromatic amine-based polyols are preferable polyether polyols for use as the polyol component in the present invention.

Some of these polyols include polyether polyols derived from alkylene oxide and a polymethylene polyphenylamine which is a reaction product of formaldehyde with at least one amine selected from the group consisting of aniline, o-, m-, p-toluidine, o-, m-, p-diamino benzene, 2,4-tolylene diamine, 2,6-tolylene diamine 4,4'- or 2,4-diaminodiphenylmethane.

The most preferable polyol is the polyether polyol derived from a polymethylene polyphenylamine represented by the following general formula:

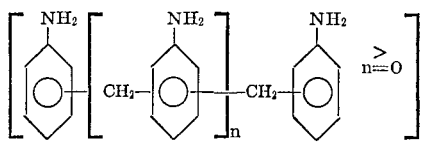

The combined use of the polyol with said polynuclear polyisocyanate and said polyepoxide gives outstanding properties in both flame resistivity and friability.

The polyepoxides suitable for the purposes of the present invention are virtually all polyepoxides which contain aromatic, aliphatic or cycloaliphatic groups together with two or more epoxide

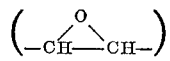

groups. Preferably the polyepoxide is aromatic-based, i.e., it contains aromatic groups. Illustrative polyepoxides are:

(1) The glycidyl ethers of polyhydric mononuclear and fused ring phenols such as resorcinol, hydroquinone, pyrocatechol, saligenin, phloroglucinol, 1,5-dihydroxynaphthalene, 1,6 - dihydroxynaphthalene, 1,7 - dihydroxynaphthalene and the like;

(2) The glycidyl ethers of non-fused polynuclear phenols represented by the general formula:

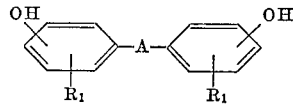

wherein $R_1$ represents 0 to 4 substituents selected from the class consisting of a halogen and lower-alkyl, A is a bridging group selected from the class consisting of

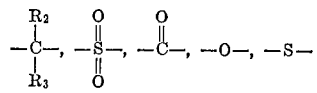

and a single covalent bond, wherein $R_2$ and $R_3$ each represent a moiety selected from the class consisting of hydrogen, lower-alkyl, lower-cycloalkyl and aryl. Typical of such compounds are the bis(glycidyl ethers) of:

4,4'-dihydroxydiphenylsulfone,
4,4'-dihydroxybiphenyl,
4,4'-dihydroxybenzophenone,
di(4-hydroxyphenyl)methane (bisphenol F),
2,2-di-(4-hydroxyphenyl)butane (bisphenol B),
2,2-di-(4-hydroxyphenyl)propane (bisphenol A),
1,1-di-(4-hydroxyphenyl)propane,
3,3-di-(3-hydroxyphenyl)pentane,
2-(3-hydroxyphenyl)-2-(4-hydroxyphenyl)butane,
1 - phenyl - 1 - (2-hydroxyphenyl)-1-(3-hydroxyphenyl)-propane,
1-phenyl-1,1-di(4-hydroxyphenyl)butane,
1-phenyl-1,1-di(4-hydroxyphenyl)pentane,
1-tolyl-1,1di(4-hydroxyphenyl)ethane,
bis(3-bromo-4-hydroxyphenyl)methane,
2,2-bis(3-bromo-4-hydroxyphenyl)propane,
bis(3-bromo-4-hydroxyphenyl)diphenylmethane,
1,1 - bis(3 - bromo - 4-hydroxyphenyl)-1-(2,5-dibromophenyl)ethane,
2,2-bis(3-bromo-4-hydroxyphenyl)propionitrile,
bis(3,5-dibromo-4-hydroxyphenyl)methane,
2,2-bis(3,5-dibromo-4-hydroxyphenyl)propane,
bis(3,5-dibromo-4-hydroxyphenyl)diphenylmethane,
1,1 - bis(3,5 - dibromo - 4-hydroxyphenyl)-1-(2,5-dibromophenyl)ethane,
bis(3-bromo-4-hydroxyphenyl)sulfone,
bis(3,5 dibromo-4-hydroxyphenyl)sulfone;

(3) The glycidyl ethers of novolac resins. The novolac resins are particularly preferred for foam formulations of this invention and are the products obtained by acid condensation of phenol, or a substituted phenol, with formaldehyde and are conventionally represented by the general formula:

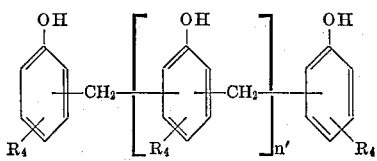

where $n'$ has an average value of from about 8 to 12 and $R_4$ represents from 0 to 4 substituents selected from halogen and lower alkyl groups. It is to be understood that the above formula is highly idealized and is an approximation only. A wide range of novolac resins of differing molecular weights is available commercially, all of which are represented approximately by the above formula. Since the class of novolac resins is so well recognized in the art, the epoxides derived therefrom by conversion of the novolacs to their glycidyl ethers (by conventional procedures, e.g., reaction with epichlorohydrin) will be referred to hereafter as "novolac resin glycidyl ethers;"

(4) Dicyclopentadiene dioxide, i.e., the compound having the formula:

(5) Vinyl cyclohexene dioxide, i.e., the compound having the formula:

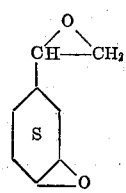

(6) The dicyclohexyl oxide carboxylates represented by the general formula:

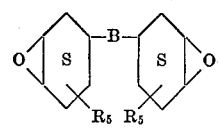

wherein $R_5$ in each instance represents from 0 to 9 loweralkyl groups, and B represents a divalent radical selected from the class consisting of:

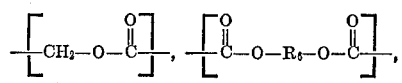

and

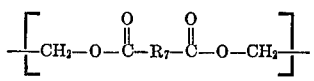

wherein $R_6$ is selected from the class consisting of loweralkylene and lower-oxyalkylene and $R_7$ is selected from the class consisting of lower-alkylene and arylene.

Examples of the dicyclohexyl oxide carboxylates are:

3,4-epoxycyclohexylmethyl 3,4-epoxycyclohexanecarboxylate,
3,4-epoxy-6-methylcyclohexylmethyl 3,4-epoxy-6-methylcyclohexylcarboxylate,
bis(3,4-epoxycyclohexylmethyl)maleate,
bis(3,4-epoxycyclohexylmethyl)succinate,
ethylene glycol bis(3,4-epoxy-6-methylcyclohexanecarboxylate) and the like.

(7) The glycidyl derivatives of aromatic primary amines represented by the formula:

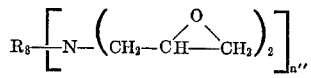

wherein $n''$ is an integer of from 1 to 3 and $R_8$ is an aromatic residue of valency $n''$ selected from the class consisting of aromatic residues having the formulae:

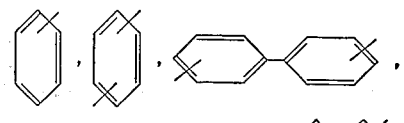

and

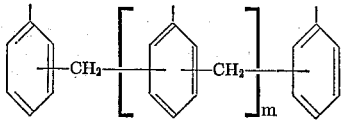

wherein A is a bridging group as hereinbefore defined and $m$ is a number having an average value of from about 0.1 to about 1.0. Illustrative of such compounds are the N,N-diglycidyl derivatives of:

aniline,
2,4-tolylene diamine,
2,6-tolylene diamine,
m-phenylene diamine,
p-phenylene diamine,
4,4'-diamino-diphenyl,
4,4'-diamino-diphenyl methane,
2,2-di(4-aminophenyl)propane,
2,2-di(4-aminophenyl)butane,
4,4'-diamino-diphenyl sulfide,
4,4'-diamino-diphenyl sulfone,
4,4'-diamino-diphenyl ether,
1,5-diamino-naphthalene, and methylene-bridged polyphenyl polyamines from about 35 percent by weight to about 85 percent by weight of methylenedianilines, the remaining parts of said mixture being triamines and polyamines of higher molecular weight said polyamine mixture having been formed by acid condensation of aniline and formaldehyde. The latter polyamine mixtures can be prepared by procedures well known in the art.

(8) The glycidyl derivatives of heterocyclic ketones, such as represented by the formula:

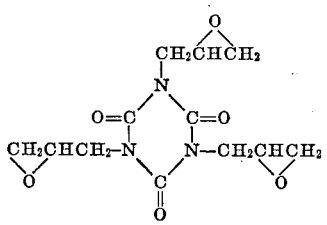

and the like.

The polyepoxide to be used in the present invention have the epoxide equivalent weight of from 70 to 6,000, and preferably from 70 to 300.

The foams prepared by the present invention have both properties of unexpectedly outstanding flame resistivity and extremely low friability.

The joint ownership of the said two properties derives only by the use of specific proportion of polyisocyanate, polyol and polyepoxide as defined below.

(1) The isocyanate has a specific isocyanate equivalent weight in a range of 100–200.

(2) The specific proportions in equivalent weight are composed of:

OH/NCO _____ 0.15–0.4
Epoxy/NCO _____ 0.1–0.6

(3) The specific proportions in weight are composed of:

|   | Percent |
|---|---|
| Isocyanate | 45–82 |
| Polyol | 15–45 |
| Epoxide | 3–30 |

(wt. percent to the total of above 3 components)

Such weight proportion can easily be understood by the FIG. 1 which illustrates the relative amounts by triangle relationship of the three components. The more preferable condition in the present invention is that the said specific proportions in both equivalent weight and weight are satisfied.

To effect three types of reactions at the same time the preferred catalysts are those which will cause gelation to form an isocyanurate at a temperature of 20° C. In 10 minutes when present in an amount of 1 to 10 grams of the catalyst per 100 grams of the compositions of said three components. The catalytically effective amount to bring about the desired polymer will vary depending on the type of catalyst utilized, the reaction conditions, etc. Generally the amount of catalyst, based on the weight of the reactants present, is in the range of about 0.01 percent to about 30 percent, and preferably about 0.1 percent to about 20 percent. For the manufacture of coatings or adhesives the catalyst more preferably is present in an amount near the lower end of said preferred range and for the manufacture of foams the catalyst is present in an amount near the upper end of said preferred range.

Particularly preferred trimerization catalysts are tertiary amine catalysts such as the dialkylaminoalkyl-substituted phenols such as 2,4,6 - tris(dimethylaminomethyl)phenol, 2,4,6-tris(dimethylaminoethyl)phenol, 2,4,6 - tris(diethylaminoethyl)phenol, mixtures of ortho- and para-dimethylaminoethylphenols, and 1:1 mixture of 2,4,6-tris(dimethylaminomethyl)phenol and diglycidyl ether of bisphenol A, and N,N',N'''-tris-(dimethylaminopropyl)-sym-hexahydrotriazine.

Other suitable trimerization catalysts of the tertiary amine type are: N,N-dialkylpiperazines such as N,N-dimethylpiperazine, N,N-diethylpiperazine and the like; trialkylamines such as trimethylamine, triethylamine, tributylamine and the like; 1,4 - diazabicyclo[2.2.2]octane, which is more frequently referred to as triethylene diamine, and the lower-alkyl derivatives thereof such as:

2-methyl triethylene diamine,
2,3-dimethyl triethylene diamine,
2,5-diethyl triethylene diamine and
2,6-diisopropyl triethylene diamine,
N,N',N''-trialkylaminoalkylhexahydrotriazines such as
N,N',N''-tris(dimethylaminomethyl)hexahydrotriazine,
N,N',N''-tris(dimethylaminoethyl)hexahydrotriazine,
N,N',N''-tris(diethylaminoethyl)hexahydrotriazine;
N,N',N''-tris(diethylaminopropyl)hexahydrotriazine
  and the like;
mono- di-, and tri(dialkylaminoalkyl) monohydric
  phenols or
thiophenols such as 2-(dimethylaminomethyl)phenol,
2-(dimethylaminobutyl)phenols,
2-(diethylaminoethyl)phenol,
2-(diethylaminobutyl)phenol,
2-(di-methylaminomethyl)thiophenol,
2-(diethylaminoethyl)thiophenol,
2,4-bis(dimethylaminoethyl)phenol,
2,4-bis(diethylaminobutyl)phenol,
2,4-bis(dipropylaminoethyl)phenol,
2,4-bis(dimethylaminoethyl)thiophenol,
2,4-bis(diethylaminopropyl)thiophenol,
2,4-bis(dipropylaminoethyl)thiophenol,
2,4,6-tris(dimethylaminobutyl)phenol,
2,4,6-tris(dipropylaminomethyl)phenol,
2,4,6-tris(diethylaminoethyl)thiophenol,
2,4,6-tris(dimethylaminoethyl)thiophenol, and the like;
N,N,N',N'-tetraalkylalkylenediamines such as
N,N,N',N'-tetramethyl-1,3-propane diamine,
N,N,N',N'-tetramethyl-1,3-butanediamine,
N,N,N',N'-tetramethylethylene-diamine and the like;
N,N-dialkylcyclohexylamines, such as
N,N-dimethylcyclohexylamine,
N,N-diethylcyclohexylamine and the like;
N-alkylmorpholines such as
N-methylmorpholine, N-ethylmorpholine and the like;
N,N-dialkylalkanolamines such as
N,N-dimethylethanolamine,
N,N-diethylethanolamine and the like;
N,N,N',N'-tetraalkylguanidines, such as
N,N,N',N'-tetramethylguanidine,
N,N,N',N'-tetraethylguanidine and the like.

Still other trimerization catalysts are described in detail in British Pat. 1,155,768.

When it is desired to prepare polyisocyanurate foams, any suitable blowing agent may be employed, such as inorganic blowing agents, e.g., water or boric acid, low-boiling hydrocarbons, e.g., pentane, hexane, heptane, pentene, heptene, benzene, etc., halogenated hydrocarbons such as dichlorodifluoromethane, trichlorotrifluorethane, trichlorofluoromethane, and the like.

Also suitable are reactive organic blowing agents such as the nitroalkanes, e.g., nitromethane, nitroethane, nitropropane, etc., the aldoximes, e.g., acetaldoxime, propionaldoxime, etc., acid amides, e.g., formamide, acetamide, benzamide, etc., enolizable carbonyl compounds, e.g., acetylacetone, acetacetic acid ester, etc., and nitrourea.

Optionally, a surfactant such as a silicone surfactant or a non-ionic surfactant may be employed in the isocyanurate foam formulations of this invention. The use of the surfactant is not always necessary but it is preferable in instances where a relatively fine cell structure is desired. Typical examples of suitable surfactants are dimethylpolysiloxane, siloxane-oxyalkylene block copolymers, and the like.

Other optional additives, such as flame retardants and organic or inorganic fillers usually employed in the preparation of polymer foams can also be employed in the processes of the present invention. Some of the flame retardants also tend to decrease the viscosity of the formulation during compounding. Illustrative flame retardants are tris(haloalkyl)phosphates such as tris(2 - chloroethyl) phosphate, tris(2-bromoethyl)phosphate, tris (2,3-dichloroethyl)phosphate, tris(2,3-dibromoethyl)phosphate, monoammonium phosphate, ammonium polyphosphates, sodium borate, di(2-haloalkyl)-2-haloalkanephosphonates such as di(2-chloroethyl)-2-chloroethane phosphonate, di-(2-chloropropyl) 2-chloropropane phosphonate, di(2-bromopropyl) 2-bromopropane phosphonate, antimony oxides, polyvinyl chloride resins, dialkyl alkanephosphonates such as dimethyl methylphosphonate, dialkyl allylphosphonate, dimethyl benzylphosphonate, diamyl amylphosphonate, trimethyl phosphorothionate, ethylene phenyl phosphorothionate, tetrahalobisphenols such as tetrachlorobisphenol A, tetrabromobisphenol A, and the like. Said flame retardants are employed in the compositions of the invention in the appropriate amounts necessary to impart the desired degree of flame retardancy to the resulting cellular polymer.

Suitable illustrative inert inorganic fillers are calcium carbonate, ammonium phosphate, polyammonium phosphate, calcium phosphate, ammonium sulfate, silica, asbestos, glass, glass fiber, mica, carbon black, carbon fiber, wood flour, antimony oxides, etc. Illustrative organic fillers are the various polymers, copolymers, and terpolymers of vinyl chloride, vinyl acetate, acrylonitrile, acrylamide, styrene, ethylene, propylene, butadiene divinyl benzene, and the like. Cellulose, starch and organic boron fiber can also be employed, if desired.

The use of halogen-containing fillers is particularly advantageous since the use of such materials imparts additional flame resistance to the produced resin whether foamed or cast.

The present invention is further illustrated by the following examples in which various polymer formulations have been compounded and the foamed or cast materials obtained therefrom tested.

TEST PROCEDURES

Flammability resistance was determined using the Butler Chimney test as reported by Krueger et al., J. Cellular Plastics, 3, 497 (1967). The percent weight retention of a foamed resin specimen was determined in this test. In some tests the Butler Chimney test was modified by using propane gas. This resulted in relatively lower (by about 10%) weight retention values which are nevertheless valid for purposes of comparison.

Fire endurance was measured using the Bureau of Mines flame penetration test as reported by Mitchell et al., Bureau of Mines Report, Invest. No. 6366 (1964). This is the relatively older version of the particular test employing a vertically rather than horizontally mounted specimen. That version was deemed preferable for the present test purposes because soot is produced in many instances when a foamed resin is burned and tends to clog the orifice of the pencil-flame burner utilized in the test, thereby occasionally producing erroneous results. Mounting of the specimen vertically greatly minimized this problem.

Smoke evolution was determined using a Rohm & Haas XP-2 Smoke Chamber. Specimens in the form of two inch cubes were burned in the Chamber using a propane-fueled burner with the fuel pressure being maintained at about 50 p.s.i.g. and the burner flame applied at a 45° angle. Smoke density was measured by determining the decrease in light intensity of a beam of light across the chamber with respect to time.

Friability was measured in accordance with ASTM Test C-421 by placing twelve 1-inch foam cubes in an 8½" cubical container together with twenty-four ¾" solid oak cubes. The container contents were then tumbled at 60 r.p.m. for ten minutes and the weight loss of the foam cubes determined.

FOAM PREPARATION PROCEDURE

The organic polyisocyanate was admixed with a premix of polyepoxide, polyol, blowing agent, and trimerization catalyst. The produced admixture was poured into 5" x 4" x 9" paper containers, cured in a circulating oven for 2 hours at 80° C. and then cured for one week at room temperature.

STARTING MATERIALS

| Designation | Composition | Average equiv. wt. |
|---|---|---|
| Isonate 135 | Polymethylene polyphenylisocyanate (NCO: 31.3%). | NCO, 133.8. |
| PAPI | Polymethylene polyphenylisocyanate containing about 50 wt. percent methylenebis(phenyl isocyanate). | NCO, 131.5. |
| Epon 828 | Bisphenol A-epichlorohydrin adduct | Epoxy, 189; OH, 1,670. |
| Epon 152 | Novolac-epichlorohydrin adduct | Epoxy, 175. |
| Epon 154 | do | Epoxy, 178. |
| L-5340 | Silicone copolymer surfactant | |
| L-5320 | do | |
| DMP-30 | 2,4,6-tris(dimethylaminomethyl)phenol | |
| Ucon 11B | Trichlorofluoromethane | |
| Isonate 901 | Polymeric isocyanate | NCO, 133.0. |
| Pluracol 529 | Functional polyether polyol containing P and Br; functionality 4.2. | OH, 287. |
| Polyol A | P, Cl and Br containing polyether polyol which is a condensation product of phosphoric acid with tetrachlorophthalic anhydride and tetrabromophthalic anhydride further reacted with propylene oxide. | |
| Isonol C151 | An Aromatic amine based polyether polyol. | OH, 420. |

| Test number | 1 | 2 | 3 | 4 | 5 | 6 |
|---|---|---|---|---|---|---|
| Composition: | | | | | | |
| Polyisocyanate | Isonate 135 (90) | Isonate 135 (90) | Isonate 135 (90) | Isonate 135 (80) | Isonate 135 (80) | Isonate 135 (70). |
| Polyepoxide | Epon 828 (10) | Epon 828 (10) | Epon 828 (10) | Epon 828 (20) | Epon 828 (20) | Epon 828 (30). |
| Polyol | Polyol A (30) | Polyol A (40) | Polyol A (50) | Polyol A (30) | Polyol A (40) | Polyol A (40) |
| Catalyst | DMP-30 (3.25) | DMP-30 (3.25) | DMP-30 (4.0) | DMP-30 (3.25) | DMP-30 (3.5) | DMP-30 (3.5). |
| Surfactant | L-5340 (1.3) | L-5340 (1.4) | L-5340 (1.5) | L-5340 (1.3) | L-5340 (1.1) | L-5340 (1.4) |
| Blowing agent | Ucon 11B (13) | Ucon 11B (14) | Ucon 11B (15) | Ucon 11B (13) | Ucon 11B (11) | Ucon 11B (14). |
| Processing characteristics: | | | | | | |
| Cream time, sec | 10 | 8 | 7 | 7 | 8 | 8. |
| Rise time, sec | 435 | 190 | 135 | 280 | 175 | 170. |
| Properties: | | | | | | |
| Density, lb./cu. ft | 2.25 | 2.12 | 2.29 | 2.25 | 2.0 | 2.0. |
| Butler Chimney (propane gas) percent wt. retained | 53.7 | 46.9 | 43.1 | 48.3 | 42.9 | 39.9. |
| Friability, percent wt. loss | 42.4 | 26.1 | 17.7 | 38.7 | 34.3 | 29.5. |
| Flame Penetration time, min | 43.5 | 16.8 | 10.3 | 51.0 | 39.0 | 14.7. |

| Test number | 7 | 8 | 9 | 10 | 11 | 12 |
|---|---|---|---|---|---|---|
| Composition: | | | | | | |
| Polyisocyanate | PAPI (70) | PAPI (60) | PAPI (50) | PAPI (60) | Isonate 135 (136) | Isonate 135 (136). |
| Polyepoxide | Epon 828 (10) | Epon 828 (20) | Epon 828 (30) | Epon 828 (10) | Epon 154 (10) | Epon 154 (20) |
| Polyol | Isonol C151 (20) | Isonol C151 (20) | Isonol C151 (20) | Isonol C151 (30) | Pluracol 529 (100) | Pluracol 529 (100). |
| Catalyst | DMP-30 (10) | DMP-30 (10) | DMP-30 (10) | DMP-30 (10) | DMP-30 (8.3) | DMP-30 (8.6). |
| Surfactant | L-5320 (1.0) | L-5320 (1.0) | L-5320 (1.0) | L-5320 (1.0) | L-5340 (3.6) | L-5340 (3.8). |
| Blowing agent | Ucon 11B (15) | Ucon 11B (15) | Ucon 11B (15) | Ucon 11B (19) | Ucon11B (31.0) | Ucon 11B (32.1). |
| Processing characteristics: | | | | | | |
| Cream time, sec | 7 | 7 | 7 | 8 | 7 | 10. |
| Rise time, sec | 120 | 90 | 90 | 80 | 137 | 165. |
| Properties: | | | | | | |
| Density, lb./cu. ft | 3.8 | 3.6 | 3.3 | 3.3 | 2.8 | 2.65. |
| Butler Chimney (propane gas) percent wt. retained | 52 | 42 | 39 | 33 | 62.7 | 62.0. |
| Friability, percent wt. loss | 14 | 14 | 12 | 1 | 15.2 | 16.4. |
| Flame penetration time, min | 70 | 60 | 15 | 20 | 56 | 217. |

| Test number | 13 | 14 | Comparison 1 | Comparison 2 | Comparison 3 | Comparison 4 |
|---|---|---|---|---|---|---|
| Composition: | | | | | | |
| Polyisocyanate | Isonate 135 (136). | Isonate 135 (136). | PAPI (70) | Isonate 135 (136). | Isonate 135 (60). | Isonate 135 (60). |
| Polyepoxide | Epon 154 (30) | Epon 152 (30) | Epon 828 (30) | | Epon 828 (40) | Epon 828 (40). |
| Polyol | Pluracol 529 (100) | Pluracol 529 (100) | | Pluracol 529 (100) | Polyol A (10) | Polyol A (60). |
| Catalyst | DMP-30 (8.8) | DMP-30 (11.6) | DMP-30 (10.0) | DMP-30 (7.9) | DMP-30 (2.75) | DMP-30 (4.0). |
| Surfactant | L-5340 (4.0) | L-5340 (4.0) | L-5320 (1.0) | L-5340 (3.5) | L-5340 (1.1) | L-5340 (1.6). |
| Blowing agent | Ucon 11B (33.7) | Ucon 11B (28.2) | Ucon 11B (19.0) | Ucon 11B (29.9) | Ucon 11B (11) | Ucon 11B (16). |
| Processing characteristics: | | | | | | |
| Cream time, sec | 8 | 10 | 6 | 13 | 10 | 7. |
| Rise time, sec | 160 | 100 | 210 | 159 | 350 | 135. |
| Properties: | | | | | | |
| Density, lb./cu. ft | 2.38 | 2.35 | 3.1 | 3.13 | 2.06 | 2.0. |
| Butler Chimney (propane gas) percent wt. retained | 66.3 | 60.2 | 58 | 45.5 | 44.0 | 28.9. |
| Friability percent wt. loss | 12.7 | 17.3 | 95 | 15.2 | 80.4 | 16.5. |
| Flame penetration time, min | 148 | 20.3 | 45 | 5.0 | 47.0 | 1.4. |

NON-FOAMED OR PARTIALLY-FOAMED RESIN FORMULATIONS

The following examples illustrate additional applications of the one-shot modified isocyanurate resins of this invention.

Example 1.—Cast Resin 10 parts by weight of bisphenol A-epichlorohydrin adduct (Epon 828), 20 parts by weight of an aromatic, amine-based polyol (Isonol 151), 70 parts by weight of a polymeric isocyanate (Isonate 901), and 1 part by weight of 2,4,6-tris(dimethylaminomethyl)phenol were admixed in a paper cup and stirred to a homogenous liquid which was then poured into a silicone rubber mold 5 mm. by 50 mm. by 70 mm.

The liquid was permitted to solidify and the solidified product was cured for 2 hours at 70° C.

The thus obtained cast resin product exhibited excellent dimensional stability and good heat stability. A service temperature of at least about 150° C. for the cast resin was indicated.

Example 2.—Film Coating

To ingredients admixed as in Example 1 was added xylene (mixture of isomers) in a ratio of about 50:50 v./v. The resulting solution was then coated on a glass plate and placed in an oven for about 3 hours at 70° C.

The produced coating was a yellow film which exhibited good adhesion to glass, high temperature resistance, high abrasion resistance, high scorch resistance, and high chemical and hydrolytic stability. The coating also exhibited good flame extinguishing properties.

Example 3.—Heat-Resistant, Fiber-Reinforced Material

Three-ply glass cloth (5-inch by 5-inch swatch) was impregnated by a formulation compounded as in Example 1 using conventional procedures for the manufacture of fiber-reinforced plastics.

The impregnated cloth was then cured for about one at 80° C. The obtained product showed excellent heat and dimensional stability and also possessed excellent chemical resistance.

Example 4.—Heat-Resistant, Fiber-Reinforced Material

Example 3, above, was repeated by first forming a 70 percent v./v. solution of the formulation in xylene. The obtained fiber-reinforced material exhibited excellent heat stability and dimensional stability. The chemical resistance of the material was also excellent.

Example 5.—Preparation of Rigid Foam Having an Integral Skin

A solution was prepared from 70 parts by weight of a polymeric isocyanate (Isonate 901) and 10 parts by weight of a bisphenol A-epichlorohydrin adduct (Epon 828).

A second solution was prepared using 20 parts by weight of a phosphorus-containing polyol (Isonol FRP-8), 1.0 part by weight of a silicone copolymer surfactant (L-5320), 7.0 parts by weight of trichlorofluoromethane (R-11B), and 5.0 parts by weight of 2,4,6-tris(dimethylaminomethyl)phenol.

Thereafter the two solutions were combined, vigorously stirred by a mechanical mixer of the electric drill type, and poured into a 3 cm. by 20 cm. by 20 cm. aluminum mold at a temperature of about 38° C. to 42° C. In molding of the foam the overpackage was 200 percent. The molded foam was permitted to stand for about 30 minutes at room temperature.

The obtained foam had a good skin and an overall density of 0.14 grams per cubic centimeter. A free-blown foam of the same formulation had a density of 0.07 grams per cubic centimeter.

The foregoing discussion and the experimental data presented herein are intended as illustrative but are not to be construed as limiting. Still other variations within the spirit and scope of this invention will readily present themselves to one skilled in the art.

What is claimed is:

1. A modified isocyanurate foam which is a product of a one-stage reaction in the presence of a blowing agent and an isocyanate trimerization catalyst from the reactants consisting essentially of
   (1) a polynuclear polyisocyanate having an isocyanate equivalent weight of from 120 to 160,
   (2) a polyepoxide in a proportion of from 0.1 to 0.6 equivalents per equivalent of said polyisocyanate,
   (3) a polyol in a proportion of from 0.15 to 0.4 equivalents per equivalent of said polyisocyanate, wherein weight ratios of said polyisocyanate, said polyepoxide and said polyol to the total weight of said three reactants are 50 to 80 percent, 5 to 30 percent and 15 to 40 percent respectively.

2. The modified isocyanurate form of claim 1, wherein the polynuclear polyisocyanate is a methylene bridged polyaryl-polyisocyanate.

3. The modified isocyanurate foam of claim 2, wherein said polyisocyanate is a mixture of polyisocyanates defined by the formula

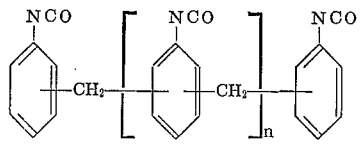

wherein $n$ is equal to or greater than zero.

4. The modified isocyanurate foam of claim 1, wherein said polyepoxide is polyglycidyl ether of 2,2-bis(4-hydroxyphenyl)propane.

5. The modified isocyanurate foam of claim 1, wherein said polyol is a polyether polyol derived from alkylene oxide and a polymethylene polyphenylamine which is a reaction product of formaldehyde with at least one amine selected from the group consisting of aniline, o-toluidine, m-toluidine, p-toluidine, o-diamino benzene, m-diamino benzene, p-diamino benzene, 2,4-tolylene diamine, 2,6-tolylene diamine, 4,4'-diaminodiphenylmethane and 2,4-diaminodiphenylmethane.

6. The modified isocyanurate foam of claim 5, wherein the polyol is a reaction product of an alkyleneoxide and a polyamine defined by the following formula

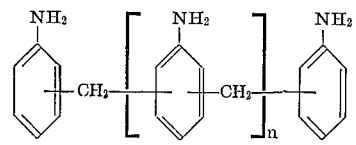

wherein $n$ has a value of 0 to 10, inclusive

7. The modified isocyanurate foam of claim 1, wherein said catalyst is a tertiary amine.

8. The modified isocyanurate foam of claim 7, wherein the tertiary amine is 2,4,6 - tris(dimethylaminomethyl)phenol.

9. The modified isocyanurate foam of claim 1, wherein the blowing agent is a halogenated hydrocarbon.

10. The modified isocyanurate foam of claim 1, wherein said reaction is carried out in the additional presence of a surfactant.

11. The modified isocyanurate foam of claim 1, wherein said reaction is carried out in the presence of at least one additive selected from the group consisting of a pigment, flame retardant and filler.

12. The modified isocyanurate foam of claim 1, wherein the tertiary amine is present in an amount of from 0.01 to 20 percent by weight based on the reactants present.

13. A process for producing a modified isocyanurate polymer which comprises admixing and reacting a polynuclear polyisocyanate with a polyepoxide, a polyol, and an isocyanate trimerization catalyst in the presence of a solvent, wherein said polynuclear polyisocyanate has an isocyanate equivalent weight of from 120 to 160, said polyepoxide is in a proportion of from 0.1 to 0.6 equivalents per equivalent of said polyisocyanate, said polyol is in a proportion of from 0.15 to 0.4 equivalents per equivalent of said polyisocyanate, and the weight ratios of said polyisocyanate, said polyepoxide and said polyol to the total weight of said three reactants are 45–82 percent, 3–30 percent and 15–45 percent, respectively.

14. A process for producing an improved modified isocyanurate foam having simultaneously low friability, low smoke evolution, high flame resistivity and low flammability which comprises admixing a polynuclear polyisocyanate with a polyepoxide, a polyol, a blowing agent and an isocyanate trimerization catalyst, wherein said polynuclear polyisocyanate has an isocyanate equivalent weight of from 120 to 160, said polyepoxide is in a proportion of from 0.1 to 0.6 equivalents per equivalent of said polyisocyanate, said polyol is in a proportion of from 0.15 to 0.4 equivalents per equivalent of said polyisocyanate, and the weight ratios of said polyisocyanate, said polyepoxide and said polyol to the total weight of said three reactants are 50 to 80 percent, 5 to 30 percent and 15 to 40 percent respectively.

15. A process of claim 14, wherein the polynuclear polyisocyanate is a methylene bridged polyaryl polyisocyanate.

16. A process of claim 15, wherein the polyisocyanate is a mixture of polyisocyanates defined by the formula

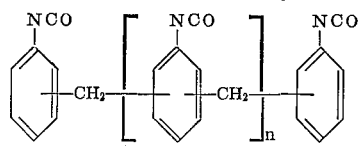

wherein $n$ is equal to or greater than zero.

17. A process of claim 14, wherein the polyol is a polyether polyol derived from alkylene oxide and a polymethylene polyphenylamine which is a reaction product of formaldehyde with at least one amine selected from the group consisting of aniline, o-toluidine, m-toluidine, p-toluidine, o-diamino benzene, m-diamino benzene, p-diamino benzene, 2,4-tolylene diamine, 2,6-tolylene diamine, 4,4'-diaminodiphenylmethane, and 2,4 - diaminodiphenylmethane.

18. A process of claim 17, wherein the polyol is a reaction product of an alkyleneoxide and a polyamine defined by the formula

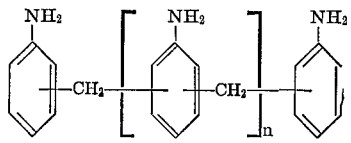

wherein $n$ has a value of 0 to 10, inclusive.

19. A process of claim 14, wherein said catalyst is a tertiary amine.

20. A process of claim 19, wherein the tertiary amine is in an amount of from 0.01 to 20 percent by weight based on the total weight of said three reactants.

21. A process of claim 14, wherein the tertiary amine is 2,4,6-tris(dimethylaminomethyl)phenol.

22. A process of claim 14, wherein the blowing agent is a halogenated hydrocarbon.

23. A process of claim 14, wherein an additive selected from the group consisting of surfactant, pigment, flame retardant and filler is present.

References Cited
UNITED STATES PATENTS

| | | | |
|---|---|---|---|
| 3,580,868 | 5/1971 | Diehr et al. | 260—2.5 |
| 3,154,522 | 10/1964 | Beitchman | 260—77.5 |
| 3,294,753 | 12/1966 | Beitchman et al. | 260—77.5 |
| 3,211,703 | 10/1965 | Gilman et al. | 260—77.5 |
| 3,222,303 | 12/1965 | Hampson | 260—2.5 |
| 3,494,888 | 2/1970 | McElroy | 260—47 |
| 3,620,987 | 11/1971 | McLauglin et al. | 260—2.5 |
| 3,644,232 | 2/1972 | Bernard | 260—2.5 |
| 3,745,133 | 7/1973 | Comunale et al. | 260—2.5 AW |

OTHER REFERENCES

Carwin Co. Bulletin "PAPI," December 1961, 3 pages.

HERBERT S. COCKERAM, Primary Examiner

U.S. Cl. X.R.

260—77.5 NC

UNITED STATES PATENT OFFICE
CERTIFICATE OF CORRECTION

Patent No. 3,849,349  Dated November 19, 1974

Inventor(s) Kurt C. Frisch and Kaneyoshi Ashida

It is certified that error appears in the above-identified patent and that said Letters Patent are hereby corrected as shown below:

Col. 1, line 7, insert after "Japan":

--, said Ashida assignor to Mitsubishi Chemical Industries, Limited, Tokyo, Japan. --

Signed and Sealed this twenty-second Day of July 1975

[SEAL]

Attest:

RUTH C. MASON
Attesting Officer

C. MARSHALL DANN
Commissioner of Patents and Trademarks